INTERCITY TIE LINE CIRCUIT WITH MULTIPLE ROUTE SEIZURE

Filed Dec. 24, 1963 5 Sheets-Sheet 1

INVENTOR
J. W. VEIGL
BY Howard R Popper
ATTORNEY

Feb. 21, 1967 J. W. VEIGL 3,305,642

INTERCITY TIE LINE CIRCUIT WITH MULTIPLE ROUTE SEIZURE

Filed Dec. 24, 1963 5 Sheets-Sheet 2

Feb. 21, 1967 J. W. VEIGL 3,305,642

INTERCITY TIE LINE CIRCUIT WITH MULTIPLE ROUTE SEIZURE

Filed Dec. 24, 1963 5 Sheets-Sheet 3

United States Patent Office 3,305,642
Patented Feb. 21, 1967

3,305,642
INTERCITY TIE LINE CIRCUIT WITH MULTIPLE ROUTE SEIZURE

John W. Veigl, Franklin Square, N.Y., assignor to Bell Telephone Laboratories, Incorporated, New York, N.Y., a corporation of New York Filed Dec. 24, 1963, Ser. No. 333,008
9 Claims. (Cl. 179—26)

Figure 1:
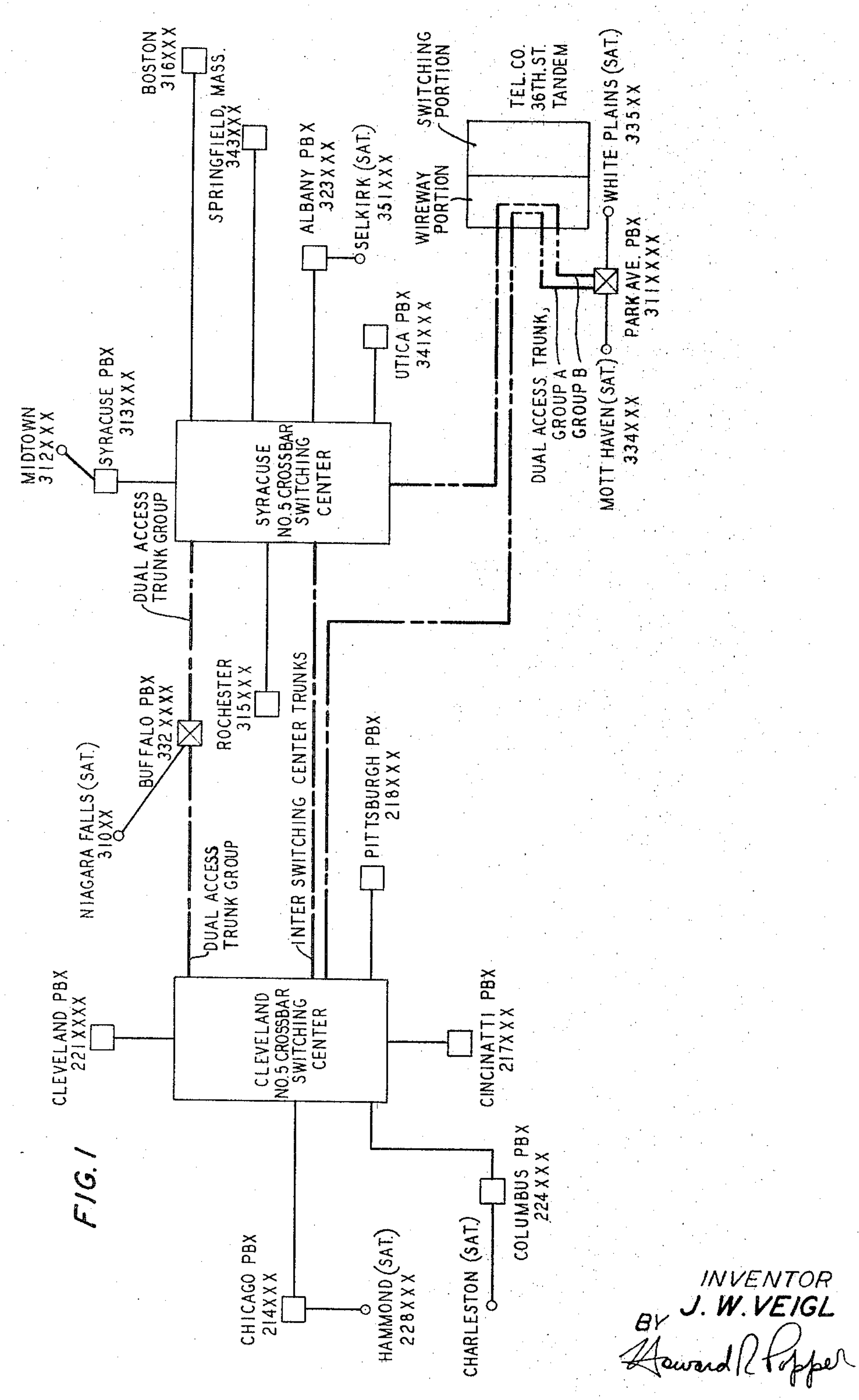

This invention relates to telephone switching systems and more particularly to private network switching systems having stations grouped about two or more remote switching centers.

Although direct distance dialing has contributed to the growth of the common carrier switching network and has facilitated rapid general purpose communication, there are some private network switching systems whose requirements are such that they are not amenable to solution in accordance with the uniform numbering procedures taken in executing the direct distance dialing concept. Certain telephone customers require, for business or other reasons, that extensions shall continue to have the same number of digits that tradition has established no matter what improvements might otherwise be achieved by resorting to a uniform system of numbering. The direct distance dialing arrangements presently used in the common carrier message network system cannot economically be equipped to handle nonuniform numbering plans. Furthermore, the adapting of the direct distance dialing network to the nonuniform numbering plans required by these private network customers would almost certainly require that new groups of special "area code" numbers be evolved to condition the system for recognizing and distinguishing private network traffic from the common carrier message network traffic. There are only 152 possible area codes available for use in the direct distance dialing message network and only 640 office codes per area. The present growth rate in the message network system indicates that area codes might well be hard pressed to keep up with the additional burden of private network traffic.

Private network systems are characterized by the use of telephone switching equipment such as private branch exchange switching systems located at each of the various different premises of the telephone customer. On a geographic basis it is sometimes found that these private branch exchanges may be grouped about one or more telephone company switching centers. On a traffic basis, however, it often happens that at least one of these private branch exchanges generates and receives a considerable amount of traffic from PBX's homing on a telephone company switching center different than its own. More particularly, such a private branch exchange may generate considerable amounts of traffic both to PBX's homing on its telephone company switching center as well as to PBX's homing on a remote telephone company switching center.

All stations of private branch exchanges homing on the same telephone company switching center may conveniently be assigned an initial identifying digit to distinguish that station from stations homing on other switching centers. This initial identifying digit, however, cannot itself effectively be used to route traffic to the appropriate switching center because it reduces the number of codes available for assignment to local telephones of the private branch exchange. Adding a plurality of access code digits or even translating the "office code" portion of a called PBX number for routing the call to the appropriate switching center entails the disadvantage on the one hand of unduly increasing the number of digits required to be dialed to reach the desired station and on the other hand of providing expensive digit registration equipment on the customer's premises. The customer may also have requirements which prohibit the use at high calling rate PBX's of additional directing digits which are different for calls to PBX's homing on different telephone company switching centers. The improvement of private network switching under these conditions necessitates that the customer be given high priority access to the switching network, that stations be permitted to retain their traditional telephone numbers, and that the number of digits dialed to call any telephone in the system be at an absolute minimum.

In accordance with the principles of the present invention, the foregoing objectives are realized by providing one or more dual access trunk circuits at each PBX which generates traffic to PBX's homing on different switching centers. The dual access trunk circuit is connected by a respective trunk group to each of the switching centers. Extension users at a PBX equipped with a dual access trunk circuit reach that circuit by dialing a single directing digit regardless of the ultimate switching center to be used on the call. The dual access trunk circuit is arranged to continuously preselect an idle outgoing trunk in the group of trunks outgoing to each switching center even before it is seized for use on an intercity call. When the dual access trunk circuit is seized, the selected outgoing trunk causes its respective switching center to return answered supervision to the dual access trunk circuit. The receipt of answered supervision from both switching centers permits dial tone to be returned to the calling extension user. The extension user then dials the number of the desired station which is the same number as would be used in calling that station from any PBX in the private network switching system. The dual access trunk circuit repeats the dialed number to both switching centers and also responds to the first digit of the called station's number to identify the trunk group appropriate to the switching center serving the called PBX. The dual access circuit then releases the selected trunk in the group to the other switching center. The call may then be completed in the usual way through the appropriate switching center and the called PBX.

It is one aspect of the present invention that when all of the trunks in a group outgoing to a particular switching centers are busy, dial tone will nevertheless be returned to the calling extension user upon the receipt of answered supervision from the other switching center. In the event that the first digit thereafter dialed corresponds to a station of a PBX homing on the switching center actually seized, the call will be completed in the manner described above. If the number indicated by the first dialed digit corresponds instead to the switching center all of whose trunks were priorly found to be busy, the call may nevertheless be completed through the switching center that was actually seized. Since the telephone company switching center is ordinarily equipped to recognize and translate the "foreign" telephone number and thus to operate as a tandem switching point, the expense of maintaining such equipment on the customer's premises is eliminated.

Accordingly, a feature of the present invention is a trunk circuit which seizes an idle trunk to each of two switching centers and which returns dial tone to the calling extension user only after both switching centers have returned answered supervision.

It is another feature of the present invention to provide a dual access trunk circuit with groups of trunks outgoing to each of two switching centers and to permit the return of dial tone to the calling extension user even when all the trunks to one switching center are busy.

Figures 2, 6:
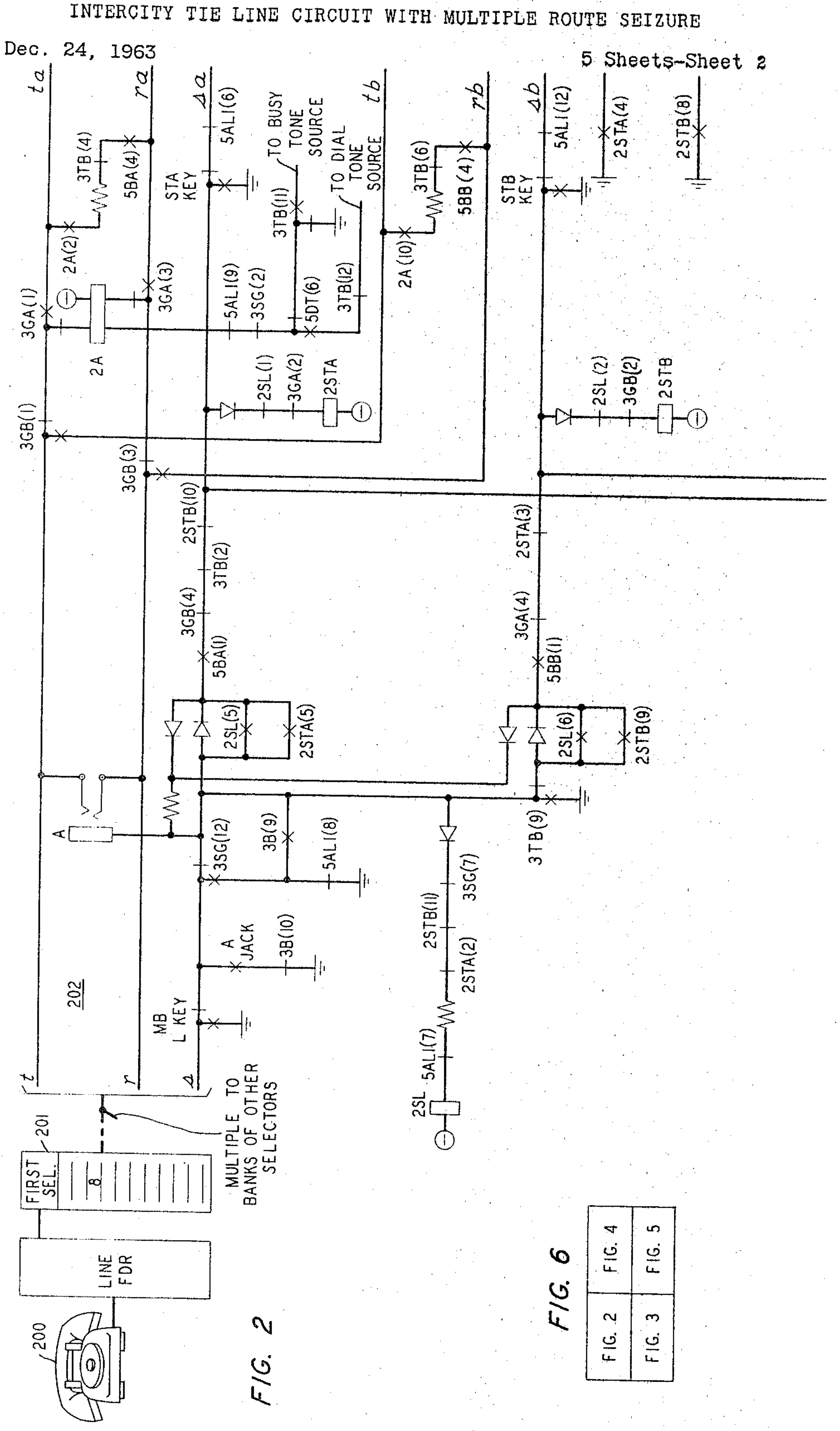
Figure 3:
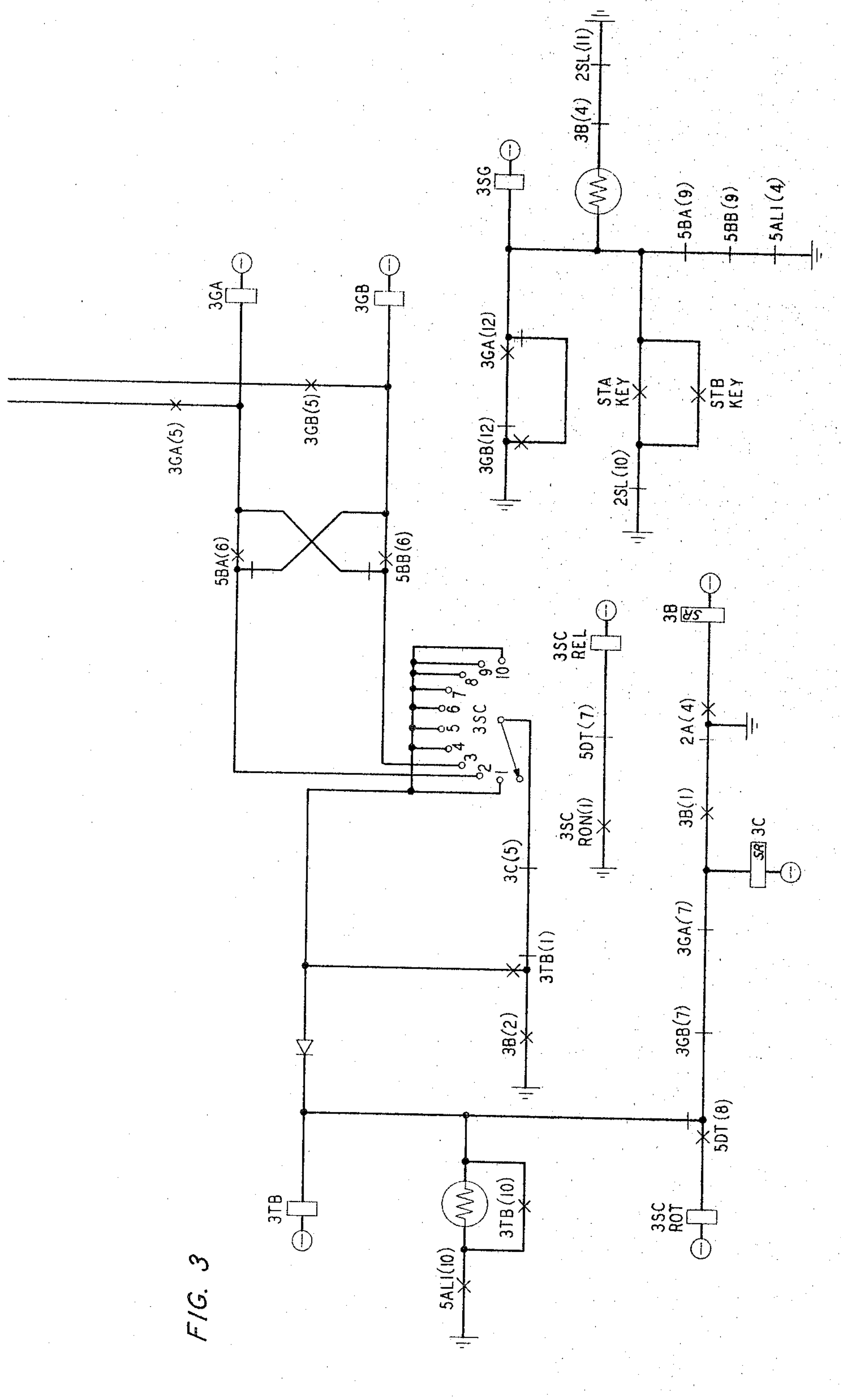
Figure 4:
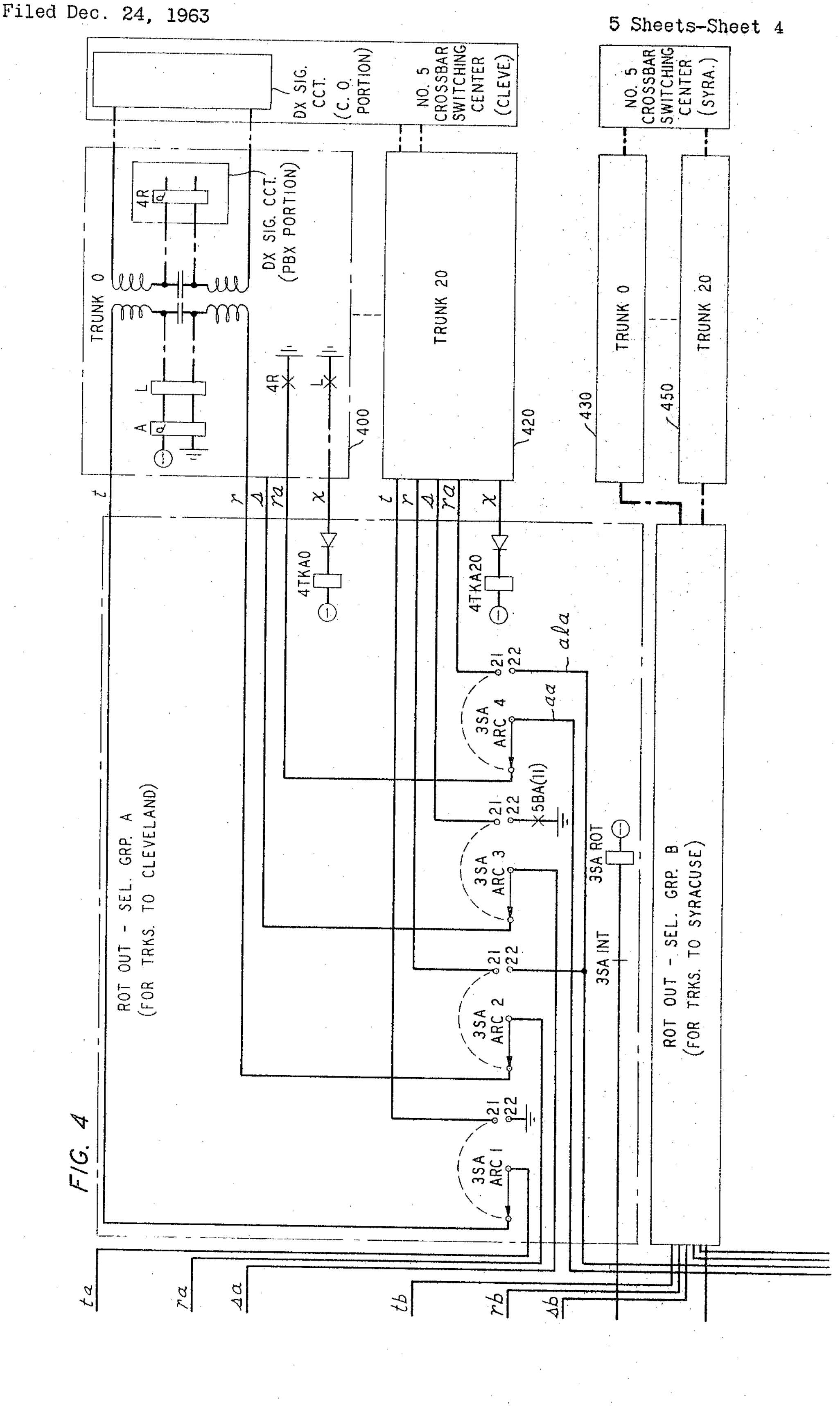
Figure 5:
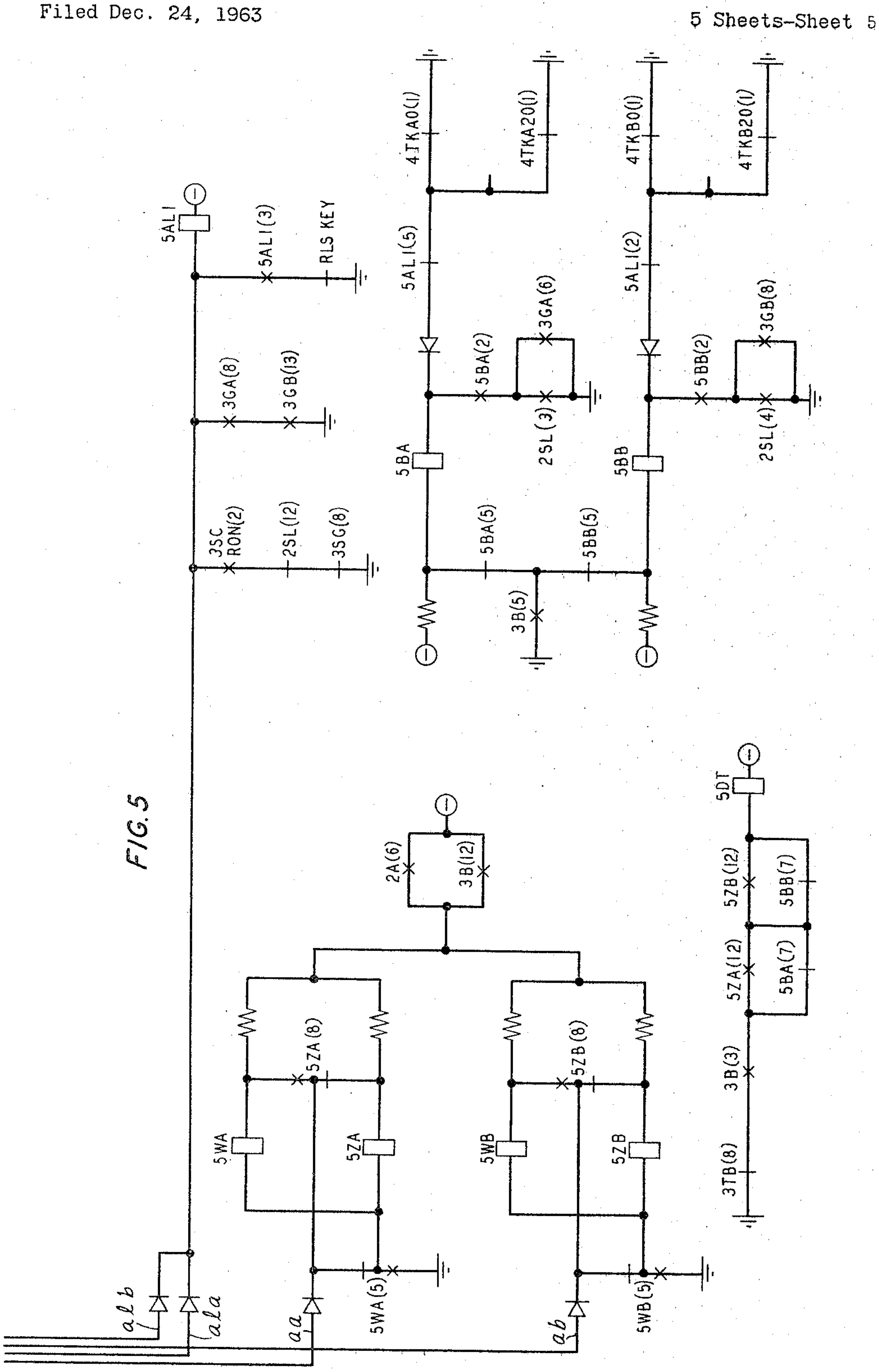

The foregoing and other objects and features may be more clearly understood by referring now to the drawing in which:

FIG. 1 shows a geographical layout of a private network switching system in accordance with the present invention;

FIGS. 2, 3, and 5 show a portion of the dual access trunk circuit;

FIG. 4 shows the remainder of the dual access trunk circuit as well as the group of trunks outgoing to each of the switching centers; and FIG. 6 shows how FIGS. 2 through 5 should be arranged.

Referring now to FIG. 1, an illustrative private network switching system is shown in which the private branch exchanges belonging to a particular telephone customer are clustered about switching centers located at Cleveland and Syracuse, respectively. These switching centers advantageously may use No. 5 crossbar switching equipment of the type described in A. J. Busch Patent 2,585,904, February 19, 1952. The private network customer's PBX's at Buffalo and at New York City generate considerable amounts of traffic to stations of the PBX's homing on the Cleveland switching center (Pittsburgh, Cincinnati, Columbus, and Chicago PBX's) as well as to the stations of PBX's homing on the Syracuse switching center Rochester, Utica, Albany, Springfield, and Boston PBX's).

It will be noted that the numbers of stations of PBX's homing on the Cleveland switching center all begin with the digit "2" and that stations of PBX's homing on the Syracuse switching center all begin with the digit "3." Certain of the PBX's, such as the ones at Chicago and at Park Avenue, have satellite PBX's. For example, the Hammond PBX is a satellite of the Chicago PBX and the White Plains PBX is a satellite of the Park Avenue PBX. The numbering and switching plans are such that a call from a station of the Pittsburgh PBX to a station of the Chicago PBX may be completed merely by dialing an access code digit to reach the Cleveland switching center and then the Chicago PBX's station number 214XXX. The same procedure would be followed at any of the other PBX's homing on the Cleveland switching center. A caller at the Pittsburgh PBX may reach a station of the Hammond satellite PBX by dialing 228XXX after the signal digit access code for the Cleveland switching center and the conditions obtaining for this caller as well as for callers at any of the other PBX's homing on the Cleveland switching center are the same. Similar conditions obtain for calls between the stations of PBX's homing on the Syracuse switching center. Disregarding temporarily the high calling rate PBX's at Buffalo and at Park Avenue, calls between stations of PBX's homing on different switching centers may be handled in similar fashion except that the caller will have to dial an access digit that will identify the telephone company switching center serving the called PBX. While this is entirely satisfactory when only a few such calls are made, when calling rates to remote PBX's are high, such as at the Buffalo and Park Avenue PBX's, some difficulty may be encountered. For example, the caller must dial the correct access digit and under pressure he may not always do so. Again, the trunks to the dialed switching center may all be busy and the call would accordingly be blocked. To obviate these difficulties a dual access trunk circuit (shown in detail in FIGS. 2 through 5) is provided at the Buffalo and at the Park Avenue PBX's. Considering the Park Avenue PBX, for example, its dual access trunk circuit controls two trunk groups which are routed over the wire ways of the 36th Street tandem office to the Syracuse and Cleveland switching centers. The trunks are not selected by area code dialing at the Park Avenue PBX and do not become involved in any of the switching functions of the 36th Street tandem office and thus impose no burden on its toll traffic handling facilities.

A station user at the Park Avenue PBX desiring to call a station of the Chicago PBX (or a station of any of the Park Avenue PBX's satellite PBX's desiring to make the same call) proceeds by dialing an access code digit such as the digit "8" to seize the dual access trunk circuit. The dual access trunk circuit is preconditioned to have an available trunk in the trunk groups outgoing to the Syracuse and Cleveland switching centers. The available trunk transmits a service request to its respective switching center and when the respective switching center is in condition to accept the call, it returns answered supervision over its respective trunk to the Park Avenue PBX. The dual access trunk circuit at the Park Avenue PBX responds to the return of answered supervision from each switching center and when this has been obtained from both switching centers, the dual access trunk provides dial tone to the called station at the Park Avenue PBX (or of the satellite of the Park Avenue PBX). The calling station then dials the ordinary station number of the desired PBX station which has been assumed to be a station of the Chicago PBX. The dual access trunk circuit responds to the first digit of the called PBX number to release the selected trunk outgoing to the Syracuse switching center. The call is then completed in the usual manner through the Cleveland switching center and the Chicago PBX.

While the dual access trunk circuit at the Park Avenue PBX is provided with sufficient trunks outgoing to the Cleveland and Syracuse switching centers to handle the normally expected amount of traffic, it is possible that a temporarily high calling rate to Cleveland, for example, may busy all the trunks outgoing to the Cleveland switching center. Under these conditions, a calling station at Park Avenue, or at one of its satellites, upon being connected to the dual access trunk circuit will still be furnished with dial tone when answered supervision is returned from the Syracuse switching center. Assuming that it is still desired to make a call to a station of the Chicago PBX, the dual access circuit upon receiving the first digit of the called station's number does not release the selected trunk to the Syracuse switching center but, instead, permits the call to complete. Under these conditions, the Syracuse switching center operates as a tandem switching point and completes the call over one of the interswitching center trunks to the Cleveland switching center.

The manner in which the dual access trunk circuit operates is shown in more detail in FIGS. 2 through 5.

Referring now to FIG. 2, a PBX station 200 at the Park Avenue PBX or at one of its satellite PBXs removes the receiver from the switchhook and obtains dial tone in the usual manner. The station user may place any call in the usual manner to any of the stations directly served by the Park Avenue or satellite PBX. To place a call to a PBX homing on either the Cleveland or Syracuse switching centers, the calling part dials the access digit "8". The first selector 201 rises to the eighth level and selects an idle one of the dual access trunk circuits appearing on the eighth level of the terminal bank. For simplicity, only one such dual access circuit 202 is shown. Before the first selector 201 cuts through to the idle dual access trunk 202, the selector in the conventional manner temporarily grounds lead *s*. This temporary ground finds its way from lead *s* to lead *sa* over make contact 5BA(1) and is continued over lead *sa* in FIG. 4 to one of the 21 trunks outgoing to the Cleveland switching center. The ground also finds its way from lead *s* to lead *sb* over make contact 5BB(1) and is continued in FIG. 4 to one of the 21 trunks outgoing to the Syracuse switching center. The ground on lead *s* also operates relay 2SL.

Before describing the manner in which the relays in FIG. 2 are operated, it is desired to explain the manner in which an idle trunk outgoing to each of the switching centers is preselected before the seizure of trunk 202 by selector 201 as well as the manner in which make contacts 5BA(1) and 5BB(1) are operated. Referring now to FIG. 4, it will be seen that each of the 21 trunks connecting the dual access trunk circuit to the Cleveland switching center has a respective one of the 4TKAO–20 relays assigned it in rotary out-selector group A. A similar set of relays (4TKBO–20), not shown, is provided in rotary out-selector group B for the 21 trunks outgoing to the Syracuse switching center. However, for the purpose of simplicity, the windings of the 4TKBO–20 relays and the details of the circuitry of the rotary out-selector group B are omitted, it being understood that the circuitry is essentially identical to that of the depicted rotary out-selector group A. Any idle trunk will have its associated 4TKA– or 4TKB– relay nonoperated. Relay 4TKAO, for example, nonoperated, at its make contact 4TKAO(1) in FIG. 5, provides an operating ground for relay 5BA. As long as at least one of relays 4TKAO–20 is not operated, relay 5BA will be operated. Similarly, as long as one of relays 4TKBO–20 is not operated, relay 5BB will be operated. Relay 5BA operated, at the make contact of its transfer contacts 5BA(6) in FIG. 3, prepares a path for operating relay 3GA from the No. 2 bank terminal of stepping switch 3SC. Relay 5BA operated, at its make contact 5BA(1) in FIG. 2, connects lead *s* to lead *sa* and, at its make contact 5BB(1), connects the lead *s* to lead *sb*. Lead *sa* is connected in FIG. 4 to the arc 3 wiper of rotary out-selector 3SA. The arc 3 wiper at any time rests on a terminal associated with the *s* lead of one of the 21 trunks 400–420 outgoing to the Cleveland switching center. Trunk 400, for example, has its *s* lead connected to the first terminal of arc 3 and grounds this terminal whenever the trunk is busy. The ground appearing on the bank of arc 3 is continued over the arc 3 wiper to lead *sa* in FIG. 2 operating relay 2STA. Relay 2STA, at its make contact 2STA(4), operates the rotary magnet of the 3SA out-selector, advancing the wipers to the next terminal. The rotary magnet will continue to operate and release until a trunk is found whose *s* lead has not grounded its corresponding terminal on arc 3 of rotary out-selector 3SA. When an idler circut is found, no ground will be applied to lead *sa* and relay 2STA will release. Relay 2STA released, at its back contact 2STA(2), prepare an operating path to the winding of relay 2SL. Make contact 2STA(5) also releases at this time, it having been operated while the rotary out-selector was hunting for an outgoing trunk to couple the ground applied by the busy trunk on lead *sa* to the *s* lead appearing on the bank of first selector 201 to prevent seizure of trunk 202 until an idle outgoing trunk was found by the rotary out-selector. In similar manner, rotary out-selector group B grounds lead *sb* whenever its arc 3 wiper (not shown) is positioned on a busy one of trunks 430-450 and removes the ground when its arc 3 wiper has come to rest on an idle one of these trunks. Relay 2STB is therefore released when rotary out-selector group B is positioned on an idle one of the trunks to the Syracuse switching center. Relay 2STB released, at its back contact 2STB(11), makes the winding of relay 2SL available to be operated when trunk 202 is seized by first selector 201.

The temporary ground applied by first selector 201 to lead *s* operates relay 2SL. Relay 2SL operated, at its back contact 2SL(1), interrupts the operating path for relay 2STA and, at its back contact 2SL(2), interrupts the operating path for relay 2STB. Relay 2SL operates faster than either relays 2STA or 2STB so that the latter two relays do not falsely operate in response to the temporary ground applied by selector 201. The ground on lead *s* is continued, as described above, to leads *sa* and *sb* to busy the trunks selected by rotary out-selector group A and rotary out-selector group B so that these trunks cannot be seized for use on an incoming call by the remote switching centers. Relay 2SL, at its make contact 2SL(5), directly connects the *s* and *sa* leads so that the ground returned by the selected trunk will hold relay 2SL as well as first selector 201 operated. Relay 2SL, at its make contacts 2SL(3) and 2SL(4), FIG. 5, provides a locking path for relays 5BA and 5BB, respectively, to hold these relays operated in the event that the last idle one of trunks 400–420 or 430–450 has been seized.

When first selector 201 cuts through, relay 2A (FIG. 2) is operated over the subscriber loop from station 200. Relay 2A operated, at its make contact 2A(2), places a resistance bridge across leads *ta* and *ra* seizing the trunk selected by rotary out-selector 3SA. At its make contact 2A(10), relay 2A places a resistance bridge across leads *tb* and *rb* seizing the trunk selected by the rotary out-selector for the group B trunks. At its make contact 2A(6), FIG. 5, relay 2A makes resistance battery available to relays 5WA, 5ZA, 5WB, and 5ZB. At the make contact of its transfer contact 2A(4), FIG. 3, relay 2A operates relay 3B.

Relay 3B operates and, at its make contact 3B(12) in FIG. 5, shunts make contact 2A(6). Relay 3B operated, at its make contact 3B(5), makes available a path to shunt down resistance battery to either relay 5BA or 5BB. This path would be completed over back contact 5BA(5) or 5BB(5) if either relays 5BA or 5BB were released when trunk 202 was seized. This shunting of the resistance battery prevents inadvertent reoperation of one of these relays should a trunk in the group of trunks causing the release of one of these relays suddenly become idle. However, as it has been assumed that relays 5BA and 5BB were operated, their respective back contacts 5BA(5) and 5BB(5) prevent shunting down of the operating battery. Relay 3B, at its make contact 3B(3), FIG. 5, prepares an operating path for relay 5DT. Relay 3B, at its make contact 3B(2) in FIG. 3, connects ground to the wiper of stepping switch 3SC and, at its make contact 3B(1), prepares a path to the winding of relay 3C. Relay 3B operated, at its make contact 3B(9) in FIG. 2, grounds lead *s* under control of contact 5ALI(8).

Upon the seizure of an idle trunk outgoing to the switching center at Cleveland, for example, the switching center causes its DX signaling circuit to return a signal indicative of answered supervision to the DX signaling circuit at the PBX portion of the outgoing trunk. Trunk relay 4R responds to the return of answered supervision and, at its make contact 4R, grounds lead *ra* associated with the trunk's appearance on arc 4 of selector 3SA. The ground on lead *ra* is continued over the arc 4 wiper of selector 3SA to operate relay 5WA. The return of answered supervision from the Syracuse switching center results in the operation of relay 5WB. Relay 5WA operated locks over the make contact of its transfer contacts 5WA(5) and relay 5WB operated locks over the make contact of its transfer contacts 5WB(5). When the Cleveland switching center associates a sender with the selected trunk over which answered supervision has been returned, answered supervision is removed and relay 5ZA operates. (The ground accompanying answered supervision shunts down the resistance battery to relay 5ZA until answered supervision is removed.) Relays 5ZA and 5ZB operated, after the removal of answered supervision by the Cleveland and Syracuse switching centers, respectively, complete the operating path for relay 5DT. Relay 5DT operated, at its make contact 5DT(6), FIG. 2, connects dial tone in series with one winding of relay 2A to lead *t*. Dial tone is thus returned to the calling station 200.

After receiving dial tone, the party at station 200 dials the ordinary telephone number of the called PBX station. Relay 2A follows dial pulses and, at its make contact 2A(2), repeats them over the trunk to the Cleveland switching center. At its contact 2A(10), the dial pulses are repeated to the Syracuse switching center. On the first release of relay 2A, the back contact of transfer contacts 2A(4), FIG. 3, completes an operating path to the winding of relay 3C. This same contact completes an operating path to the winding of the rotary magnet of stepping switch 3SC that was priorly prepared by the operation of make contact 5DT(8). Relay 3C is slow release and maintains itself operated during the dial pulses. The rotary magnet of stepping switch 3SC follows the operation and release of relay 2A and steps its wiper accordingly. Since it has been assumed that the extension user of station 200 has dialed the number of a station at the Chicago PBX, the first digit dialed will be the digit "2" and the wiper of stepping switch 3SC will position itself in contact with terminal 2 of the stepping switch terminal bank and operate relay 3GA over the path made available by operated make contact 5BA(6). Relay 3C releases upon the completion of dialing and, at its back contact 3C(5), applies ground to operate relay 3GA. Relay 3GA operated, at its make contact 3GA(5), locks to lead *sa*; at its make contact 3GA(6) in FIG. 5, shunts make contact 2SL(3) to prevent relay 5BA from releasing; at its back contact 3GA(4) in FIG. 2, isolates lead *sb* from lead *s*; at its back contact 3GA(2), opens the operating path for relay 2STA; at its transfer contacts 3GA(1) and 3GA(3), cuts through leads *t* and *r* to leads *ta* and *ra* and removes the winding of relay 2A from the talking path; and, at its make contact 3GA(12) in FIG. 3, operates relay 3SG. Relay 3SG operated, at its back contact 3SG(7), FIG. 2, releases relay 2SL and, at its make contact 3SG(12), connects ground to the *s* lead to hold the first selector 201 and the connection to the calling station 200. Relay 2SL released, at its back contact 2SL(2), prepares an operating path to the winding of relay 2STB so that this relay may control the rotary outselector group B to hunt for the next idle trunk to the Syracuse switching center when trunk 202 is again idle and made available for use on another call. Relay 2STA, however, is prevented from operating by operated back contact 3GA(2).

Relay 2A removed from the talking path releases and, at its released make contact 2A(10), releases the trunk that was selected to the Syracuse switching center. Relay 2A released, releases relay 3B. Relay 3B released removes ground from lead *s* and from the wiper of stepping switch 3SC. Relays 2A and 3B released, release relays 5ZA, 5ZB, and 5DT. Relay 5DT released, at its back contact 5DT(7), FIG. 3, completes an operating path to the winding of the released magnet for stepping switch 3SC and stepping switch 3SC releases. The calling party at station 200 dials the second and subsequent digit to the called station's number in the usual manner and the connection is established through the switching center at Cleveland.

On the other hand, had it been assumed that the calling party at station 200 were placing a call to a station of a PBX homing on the Syracuse switching center, the first digit dialed would have caused stepping switch 3SC to operate relay 3GB instead of relay 3GA. Relay 3GB operated would lock over its make contact 3GB(5) to lead *sb*. At its make contact 3GB(8), FIG. 5, relay 3GB prevents relay 5BB from releasing; at its back contact 3GB(4), FIG. 2, isolates lead *sa* from lead *s*; at its back contact 3GB(2), opens the operating path for relay 2STB; at its transfer contacts 3GB(1) and 3GB(3), removes relay 2A from the signaling path and connects leads *t* and *r* to leads *tb* and *rb*, respectively. Relay 3GB operated, at its make contact 3GB(12), FIG. 3, operates relay 3SG. Relay 3SG performs functions similar to those described previously. The release of relay 2A, upon its being disconnected from the signaling path by relay 3GB, removes the holding bridge between leads *ta* and *ra* and releases the selected trunk to the Cleveland switching center. Relay 3B is released as discussed previously and initiates a sequence of operations similar to that described previously.

*All outgoing trucks to Cleveland switching center busy*

As discussed above, whenever one of the 21 trunks outgoing to the Cleveland switching center becomes busy, it operates its associated 4TKA– relay in FIG. 4. When all of relays 4TKA0–20 are thus made busy, relay 5BA is released. Relay 5BA (FIG. 5) released, at its released make contact 5BA(4), (FIG. 2) prevents trunk 202 from placing a calling bridge between leads *ta* and *ra*. Relay 5BA released, at the released make contact of its transfer contacts 5BA(6) FIG. 3, prevents the operation of relay 3GA when stepping switch 3SC is advanced by the first dialed digit to the No. 2 terminal of its terminal bank and, at the back contact of its transfer contacts 5BA(6), prepares an operating path to the winding of relay 3GB. Relay 5BA, at its released make contact 5BA(1), FIG. 2, isolates lead *sa* from lead *s*. Relay 5BA once released is prevented from being suddenly reoperated and interfering with dialing should one of trunks 400–420 become available. The back contact 5BA(5), FIG. 6, is provided to prevent this reoperation of relay 5BA if relay 3B is operated, as will hereinafter be more fully described. It should be noted at this point that transferring the No. 2 terminal of the contact bank of the 3SC stepping switch from the winding of relay 3GA to the winding of relay 3GB means that relay 3GB will be operated when the extension user dials the digit "2". Relay 3GB will also be operated if the extension user dials the digit "3" because it has been assumed released.

When trunk 202 is seized by the calling extension station 200, operations proceed in the same manner as described for conditions when both relays 5BA and 5BB are operated with the following exceptions. The seizure of trunk 202 and the operation of relay 2A causes a holding bridge to be placed only between leads *tb* and *rb* and only an idle one of the trunks 430–450 outgoing to the Syracuse switching center is seized. When the Syracuse switching center returns answered supervision, relay 5WB will be operated in the usual manner, but relay 5WA will not be operated because no trunk to the Cleveland switching center could be seized by trunk 202. When the Syracuse switching center removes answered supervision, relay 5ZB operates. Relay 5ZB operated with relay 5BA released provides an operating path to the winding of relay 5DT. This operating path may be traced in FIG. 5 from ground, over back contact 3TB(8), make contact 3B(3), back contact 5BA(7), and make contact 5ZB(12), to the winding of relay 5DT. It will be recalled that when both relays 5BA and 5BB are operated, dial tone was provided by the operation of relay 5DT when relay 3B was operated. Relay 5DT is normally held operated by the subsequent operation of relays 5ZA and 5ZB. In the case where all of the trunks to the Cleveland switching center are busy, relay 5ZA will not be operated. However, released make contact 5ZA(12) is bridged by the back contact 5BA(7) thereby completing the holding path for relay 5DT. The operation of relay 5DT, at its make contact 5DT(6) in FIG. 2, provides dial tone to the line in series with the winding of relay 2A.

The calling party dials the number of the desired PBX station and stepping switch 3SC steps its wiper to the terminal on its terminal bank corresponding to the first dialed digit. If the first dialed digit is the digit "2" or the digit "3", relay 3GB is operated. The operation of relay 3GB connects leads *t* and *r* to leads *tb* and *rb* and performs all the functions previously described for transmitting the remaining numbers dialed by station 200 over the selected one of trunks 430–450 to the Syracuse switching center. Under these circumstances, the Syracuse switching center will recognize a dialed number as one pertaining to a PBX homing on the Cleveland switching center and will pick an available one of the interswitching center trunks shown in FIG. 1 for completing the call via the Cleveland switching center. The manner in which the Syracuse switching center recognizes the foreign telephone number and translates this into appropriate routing information being well known, it is not necessary that it be described herein.

If it is desired not to permit the call to be processed via a trunk to the available switching center when all trunks to one switching center are busy, the back contacts of transfer contacts 5BA(6) and 5BB(6) instead of being connected as shown in FIG. 3 may be connected to the winding of relay 3TB. Under these circumstances, dial tone would still be made available to the calling extention user at station 200. However, if relay 5BA were released because all of the trunks to the Cleveland switching center were busy and the call were for a PBX homing on the Cleveland switching center, the selection of terminal 2 by stepping switch 3SC would provide an operating ground to the winding of relay 3TB. The operation of relay 3TB, at its make contact 3TB(11) in FIG. 2, provides busy tone to the calling extension user at station 200. If the calling extension user has obtained access to trunk 202 by dialing the initial directing digit "8" and subsequently dials a number whose first digit is other than "2" or "3", the wiper of stepping switch 3SC provides an operating ground to the winding of relay 3TB. Relay 3TB operated, at its make contact 3TB(9) in FIG. 2, grounds lead *s* to hold the connection through first selector 201; at its back contact 3TB(4) and at its back contact 3TB(6), prevents application of calling bridges between leads *ta* and *ra* and between leads *tb* and *rb*, respectively; at its back contact 3TB(8) in FIG. 5, releases relay 5DT.

When the calling party disconnects, relay 2A releases, releasing relay 3B (FIG. 3). Relay 3B released, at its released make contact 3B(2), releases relay 3TB. Relay 3TB released removes ground from lead *s* and allows the connection through selector 201 to the calling party to be released. The circuit is then available for use on other calls.

Relay 5ALI in FIG. 5 is an alarm relay which is provided to indicate malfunction of certain portions of the trunk. The operation of relay 5ALI activates a suitable alarm (not shown) so that the trouble condition can be determined. For example, should relays 3GA and 3GB both operate on the first digit dialed due to misalignment of the wiper, their contacts on the 3SC stepping switch provide an operating path to relay 5ALI over make contacts 3GA(8) and 3GB(13). On the other hand, if stepping switch 3SC is off normal when either relay 2SL or 3SG is normal, an operating path is completed to the winding of relay 5ALI over back contact 3SG(8), back contact 2SL(12), and a rotary off normal make contact of stepping switch 3SC. In the event that a trouble condition occurs in rotary out-selector 3SA or in the rotary out-selector for the group B trunks, a ground will be provided over lead *ala* or *alb*, respectively. For example, a short circuit between leads *ta* and *ra* will be detected when selector 3SA steps to its No. 22 terminal by coupling the ground on terminal 22 of arc 1 of this selector over the short between leads *ta* and *ra* to terminal 22 or arc 2 of the selector, and thence to lead *ala*. In similar manner, a short between leads *sa* and *aa* will cause the ground applied to terminal 22 of arc 3 to be coupled by the short between the leads to terminal 22 of arc 4, and thence to lead *ala*.

Relay 5ALI operated, at its make contact 5ALI(3), locks to ground in series with a manual release key. Relay 5ALI operated, at its back contact 5ALI(8), FIG. 2, removes ground from lead *s* allowing the selectors to release. At its back contact 5ALI(7), relay 5ALI releases relay 2SL. Relay 5ALI operates and, at its make contact 5ALI(10), FIG. 3, connects ground through a thermistor to relay 3TB operating relay 3TB after a short delay. Relay 3TB operated locks over its make contact 3TB(10) in series with contact 5ALI(10). Relay 3TB regrounds lead *s* to prevent reseizure of trunk 202 until the trouble condition is determined. Upon the determination and correcting of the trouble condition, release key RLS may be operated to release relay 5ALI, thereby restoring the circuit to normal.

It is accordingly seen that the dual access trunk circuit permits a preselected idle trunk in each of a group of trunks outgoing to different switching centers to be seized upon the dialing of an initial directing digit. The return of answered supervision from each switching center and its subsequent removal permits the station selecting the dual access trunk to commence dialing the ordinary telephone number of a PBX station belonging to a PBX homing on either switching center.

It is to be understood that the above-described arrangements are merely illustrative of the principles of this invention and various other arrangements may be devised by those skilled in the art without departing from the spirit and scope of the invention.

What is claimed is:

1. A switching system comprising a first and a second telephone switching center, a respective plurality of private branch exchanges homing on said switching centers, a first plurality of trunks outgoing from one of said exchanges to said first switching center, a second plurality of trunks outgoing from said one of said exchanges to said second switching center, means at said one of said exchanges for normally selecting an idle one of said first and of said second plurality of trunks, means at said one of said exchanges for transmitting a service request signal over said idle one of said trunks to said first and to said second switching centers, and means at said one of said exchanges thereafter responsive to answered supervision from said switching centers for transmitting a called telephone number to both said first and second switching centers.

2. An intercity tie line circuit comprising a private branch exchange, a first and second switching center, a plurality of trunks connecting said exchange with each said switching center, means at said private branch exchange for selecting an idle one of said trunks for each said switching center, means for seizing said idle trunks to said switching centers responsive to the initiation of a tie line call at said private branch exchange, and means enabled by the seizure of said idle trunks for detecting the return of answered supervision transmitted by each said switching center.

3. An intercity tie line circuit for connecting a first private branch exchange with any of a plurality of other private branch exchanges homing on different telephone switching centers comprising means operable at said first private branch exchange upon the initiation of a tie line call to any of said plurality of other private branch exchanges for transmitting simultaneous service requests to said different switching centers, and means enabled by the return of answered supervision from all of said different switching centers responsive to said service requests for permitting said first private branch exchange to transmit dial pulses to said different switching centers.

4. An intercity tie line circuit according to claim 3 wherein said enabled means comprises means for detecting said answered supervision individually returned by each of said different switching centers, and means for detecting the subsequent removal of said answered supervision by said different switching centers.

5. An intercity tie line circuit according to claim 3 wherein said enabled means comprises means for registering at said first private branch exchange said dial pulses being transmitted to said different switching centers and means responsive to said dial pulse registering for canceling said service request transmitted to one of said switching centers.

6. An intercity tie line circuit for connecting a first private branch exchange with any of a plurality of other private branch exchanges served by different telephone switching centers comprising at said first private branch exchange means for normally selecting an available path to each said switching center, means for detecting when no available path to one of said centers can be selected by said selecting means, means responsive to the initiation of a tie line call at said first private branch exchange for transmitting a service request over each said available path to its respective switching center, means controlled by said selecting means for permitting said first exchange to transmit dial pulses to said switching centers only when all of said centers have responded to said service requests, and means controlled by said detecting means when no available path can be selected to one of said switching centers for transmitting said dial pulses over an available one of said paths to another of said switching centers after at least one said switching centers has responded to said service requests.

7. A switching circuit comprising a first and a second plurality of trunk outlets to remote facilities, means for initiating a service request to one of said facilities over an idle one of said first trunk outlets and to another of said facilities over an idle one of said second outlets, means thereafter responsive to the return of answered supervision over each of said outlets for permitting code digits to be transmitted to both said remote facilities, means responsive to said digits for releasing one of said trunk outlets, and means operable when none of the outlets to one of said facilities is idle for permitting said digits to be transmitted to the other of said facilities upon said return of said answered supervision therefrom.

8. In a telephone system, a private branch exchange having a plurality of first trunks extending to a first switching center and a plurality of second trunks extending to a second switching center, a plurality of calling stations, means responsive to the initiation of a call at one of said calling stations for seizing one of said first and one of said second pluralities of trunks, means responsive to answered supervision on both said seized trunks for permitting dialing from said one station, means responsive to answered supervision on only one of said seized trunks to one of said centers when all trunks to the other of said centers are busy for also permitting dialing from said one station, and means responsive to the digits dialed by said one station for releasing the unwanted one of said seized trunks.

9. In a telephone system, a private branch exchange in accordance with claim 8 wherein said seizing means includes means for preselecting idle ones of said trunks in said first and second pluralities.

References Cited by the Examiner

UNITED STATES PATENTS

| | | | |
|---|---|---|---|
| 2,809,236 | 10/1957 | Stewart et al. | 179—18.21 |
| 2,857,467 | 10/1958 | Molnar | 179—18.21 |
| 3,211,838 | 10/1965 | Ericsson | 179—27.02 |

KATHLEEN H. CLAFFY, *Primary Examiner.*

L. A. WRIGHT, *Assistant Examiner.*